United States Patent [19]

Hartman et al.

[11] Patent Number: 5,173,317

[45] Date of Patent: Dec. 22, 1992

[54] GUM COMPOSITIONS CONTAINING VINYL LAURATE/VINYL ACETATE COPOLYMER

[75] Inventors: Scott E. Hartman, Roosevelt; Steven P. Synosky, Greenbrook, both of N.J.

[73] Assignee: Wm. Wrigley Jr. Company, Chicago, Ill.

[21] Appl. No.: 784,250

[22] Filed: Oct. 29, 1991

[51] Int. Cl.$^5$ .............................................. A23G 3/30
[52] U.S. Cl. ............................................ 426/6; 426/4
[58] Field of Search ........................................ 426/3–6

[56] References Cited

U.S. PATENT DOCUMENTS

| | | | |
|---|---|---|---|
| 3,440,060 | 4/1969 | Rife et al. | 99/135 |
| 3,519,587 | 7/1970 | Wiest et al. | |
| 3,642,459 | 2/1972 | Ilnyckyj | 44/62 |
| 3,668,165 | 6/1972 | Bergmeister et al. | 260/29.6 |
| 3,791,825 | 2/1974 | Verhille et al. | 96/1.5 |
| 3,857,708 | 12/1974 | Verhille et al. | 96/1.8 |
| 3,857,816 | 12/1974 | Yamaguchi et al. | 260/63 |
| 3,870,675 | 3/1975 | Kusayama et al. | 260/32.8 |
| 3,919,178 | 11/1975 | Yamaguchi et al. | 260/79.3 |
| 3,925,542 | 12/1975 | Viout et al. | 424/47 |
| 3,929,602 | 12/1975 | Kaetsu et al. | 204/159.22 |
| 3,933,716 | 1/1976 | Kuhlmann et al. | 260/29.6 |
| 3,935,144 | 1/1976 | Hagenweller et al. | 260/24 |
| 3,937,811 | 2/1976 | Papantoniou et al. | 424/64 |
| 3,946,140 | 3/1976 | Noe et al. | 428/522 |
| 3,946,749 | 3/1976 | Papantoniou | 132/7 |
| 3,950,302 | 4/1976 | Rauterkus et al. | 260/42.52 |
| 3,962,371 | 6/1976 | Alberts et al. | 260/876 |
| 3,980,603 | 9/1976 | Bradley et al. | 260/29.6 |
| 3,984,574 | 10/1976 | Comollo | 426/4 |
| 4,000,958 | 1/1977 | Hirooka et al. | 427/389 |
| 4,028,384 | 6/1977 | Vahlensieck et al. | 60/347.8 |
| 4,042,529 | 8/1977 | Nimerick et al. | 252/363.5 |
| 4,052,323 | 10/1977 | Feneberger et al. | 252/23 |
| 4,123,405 | 10/1978 | Oyamada et al. | 260/29.6 |
| 4,129,711 | 12/1978 | Viout et al. | 526/286 |
| 4,190,687 | 2/1980 | Sugiura et al. | 427/389 |
| 4,212,939 | 7/1980 | Myrick et al. | 435/19 |
| 4,259,429 | 3/1981 | Gilliams et al. | 430/124 |
| 4,296,017 | 10/1981 | Weissgerber et al. | 260/30.6 |
| 4,299,941 | 11/1981 | Narisawa et al. | 526/273 |
| 4,394,477 | 7/1983 | Screeton | 524/319 |
| 4,443,562 | 4/1984 | Mayer | 521/83 |
| 4,452,820 | 6/1984 | D'Amelia et al. | 426/3 |
| 4,525,363 | 6/1985 | D'Amelia | 426/6 |
| 4,594,142 | 6/1986 | Achia et al. | 208/33 |
| 4,698,223 | 10/1987 | Perfetti et al. | 426/4 |
| 4,876,095 | 10/1989 | Yang | 426/3 |
| 4,968,511 | 11/1990 | D'Amelia et al. | 426/6 |

FOREIGN PATENT DOCUMENTS 2003166A 3/1989 United Kingdom .

OTHER PUBLICATIONS

La Bell, "Gum Plasticizer; Bubble Elasticity Increased, Effective Preservative Coating," *Food Processing*, May 1987.

"Allows Use of Additional Acetylated Monoglycerides," *Food Technology*, Apr. 1985, p. 30.

*Primary Examiner*—Jeanette Hunter
*Attorney, Agent, or Firm*—Willian Brinks Olds Hofer Gilson & Lione

[57] ABSTRACT

Chewing gum and chewing gum bases containing vinyl laurate/vinyl acetate copolymer as a primary elastomer component are provided. The gum compositions also contain certain elastomer plasticizers, softeners, and low melting point waxes. The chewing gum bases provided are substantially free of polyvinyl acetate and glycerol triacetate, and are particularly useful in bubble gum compositions.

10 Claims, No Drawings

GUM COMPOSITIONS CONTAINING VINYL LAURATE/VINYL ACETATE COPOLYMER

FIELD OF THE INVENTION

The present invention relates to chewing gum and chewing gum bases containing vinyl laurate/vinyl acetate copolymer as a primary elastomer.

BACKGROUND OF THE INVENTION

Gum base compositions generally include, among other things, components known in the art as elastomers. Elastomers commonly used in gum bases include polyvinyl acetate and hard elastomers such as styrene-butadiene rubber. Vinyl laurate/vinyl acetate copolymer has also been suggested for use in gum bases, however, its use has been restricted to gum bases containing polyvinyl acetate, particularly high molecular weight polyvinyl acetate.

Gum bases also typically contain a softener component. The type of softener added to a gum base composition is often dependent on the type of elastomer in the base. In the past, certain elastomers have been found to be compatible with only a limited number of softeners. For example, gum bases containing polyvinyl acetate have been limited primarily to containing glycerol triacetate as a softener. Glycerol triacetate, however, has a tendency to volatize out of the base during processing and may cause a bitter taste in the final gum product.

The processing of gum bases may also be dependent on the type of ingredients in the base. Generally, gum bases are processed with the use of heat. Some bases containing polyvinyl acetate may require cooling in order to achieve sufficient miscibility of the gum base components. In contrast, some other elastomers require increased temperatures during processing. Processing gum bases with excessive heat, however, has been found to damage the elastomer in the base. For example, heating the elastomer to too high temperatures, i.e. above 200° C, may cause depolymerization of the elastomer. Elastomer depolymerization generally results in a low molecular weight polymer that can reduce stiffness of the final gum product.

SUMMARY OF THE INVENTION

The present invention provides an improved chewing gum base comprising vinyl laurate/vinyl acetate copolymer as a primary elastomer component. The chewing gum base also comprises certain elastomer plasticizers, softeners, and low melting point waxes.

The present invention also provides chewing gum compositions that include a gum base comprising vinyl laurate/vinyl acetate copolymer as a primary elastomer component. In a preferred embodiment, the chewing gum composition is a bubble gum.

The present invention is advantageous in that it provides a gum base that has softer gum texture, reduced cohesion and bubble tack, and improved bubble formation. Further, the gum base is free of polyvinyl acetate and glycerol triacetate. The gum base is also substantially free of hard elastomers and high melting point waxes which would require longer compounding time at higher temperatures.

It should be noted that all percent values ("%") as used herein, represent weight percent.

DETAILED DESCRIPTION OF THE EMBODIMENTS

In a presently preferred embodiment, there is provided a gum base substantially free of polyvinyl acetate ("PVA") and other hard elastomers such as styrene-butadiene rubber ("SBR"). Instead, the present gum base composition comprises vinyl laurate/vinyl acetate copolymer ("VL/VA") as a primary elastomer component. In addition to VL/VA, certain elastomer plasticizers, softeners, and low melting point waxes, set forth below, are added to the gum base composition. The gum base components are processed at a uniform temperature to form a gum base having a softer texture, reduced tack, and improved bubble formation.

VL/VA contemplated for use in the present invention include, but are not limited to, Vinnapas® B500/40 VL, Vinnapas® B500/20 VL, and Vinnapas® B100/20 VL, all of which are commercially available from Wacker-Chemie (Munich, Germany). The final two digits of the VL/VA identified above indicate the percent vinyl laurate content.

Typically, VL/VA with a low vinyl laurate content tend to be firmer than those with a high vinyl laurate content. The preferable percent of vinyl laurate present, by weight of the polymer, is from about 10% to about 45%, and more preferably, from about 20% to about 40%. Most preferably, the vinyl laurate is from about 19% to about 26% of the polymer. In a most preferred embodiment, Vinnapas® B100/20 VL is added to the gum base.

Other VL/VA copolymers of food-acceptable quality are also contemplated for use in the present invention. Those skilled in the art will recognize that VL/VA having, for example, a particular softening point or viscosity, may be preferred for some types of bases. One type of VL/VA may be added to the base composition, or alternatively, a combination of two or more types may be added. Preferably, the gum base does not contain any other vinyl polymers.

The percent levels of VL/VA included in the base may vary, depending primarily on the vinyl laurate content of each VL/VA copolymer added. Preferably, VL/VA included in the base constitute from about 10% to about 45% of said base, and more preferably, from about 19% to about 26%.

In another preferred embodiment, the base also comprises, in addition to VL/VA, the soft elastomer, polyisobutylene ("PIB"). PIB added to the gum base preferably has an average GPC molecular weight of about 40,000 MWU to about 90,000 MWU, and more preferably, from about 55,000 MWU to about 70,000 MWU. PIB is included in the gum base composition from about 0% to about 20%. More preferably, PIB is from about 5% to about 15% of the base.

The chewing gum base of the present invention also comprises certain elastomer plasticizers, softeners, and low melting point waxes, described below.

Elastomer plasticizers contemplated for use in the gum base include rosin esters and terpene resins. Natural rosin esters include glycerol ester of partially hydrogenated rosin, glycerol ester of polymerized rosin, glycerol ester of partially dimerized rosin, glycerol ester of rosin, pentaerythritol esters of partially hydrogenated rosin, partially hydrogenated methyl esters of rosin, pentaerythritol ester of resin, or mixtures thereof. Synthetic elastomer plasticizers include terpene resins derived from alpha-pinene, beta-pinene and/or d-limonene.

The elastomer plasticizer constitutes from about 10% to about 45% of the base. More preferably, the elastomer plasticizer constitutes from about 10% to about 20% of the base.

The gum base further comprises a softener component. The softeners contemplated by the present invention include glycerol fatty acid esters, such as mono-, di-, and triglycerides, as well as acetylated glyceride types. The softener added to the base may also be a vegetable oil, including not limited to, palm oil, coconut oil, and palm kernel oils. Both glyceride and vegetable oil softeners contemplated contain one or more fatty acids having carbon chain length greater than 14, and include but are not limited to, myristic, palmitic, stearic, and lauric acids, as well as their unsaturated counterparts.

Preferably, the softener is a glyceride having a high lauric acid content, and more preferably, the softener is an acetylated monoglyceride having a high lauric acid content. The lauric acid content of the softener may be measured by standard techniques known in the art, including gas chromatography. Most preferred is an acetylated monoglyceride having a high lauric acid content and saponification values greater than 400.

The softener comprises from about 0.5% to about 15% of the gum base and preferably, from about 1% to about 7% of the base. The amount of softener added will vary depending on the type of VL/VA and amount of VL/VA included in the base. Generally, the ratio of total VL/VA to total softener is about 45:1 to about 2:1 and preferably, from about 16:1 to about 3:1. Most preferably, the total VL/VA to total softener ratio is about 10:1 to about 8:1.

The gum base of the present invention also comprises low melting point waxes, particularly paraffin and microcrystalline waxes having melting points less than 60° C. It is believed that these waxes provide an improved gum flavor profile and shelf-life as compared to high melting point paraffin or microcrystalline waxes. In a most preferred embodiment, the wax is a paraffin wax having a melting point less than 60° C. The low melting point wax constitutes from about 1% to about 25% of the base, and preferably, from about 7% to about 15%.

The gum base may optionally comprise other additional components, including fillers, texturizers, other softeners, colorants and whiteners, antioxidants and preservatives, or combinations thereof.

Fillers and texturizers added to the gum base may include magnesium and calcium carbonate, ground limestone and silicate types such as magnesium and aluminum silicate, clay, alumina, talc as well as titanium oxide, mono-, di-, and tricalcium phosphate, cellulose polymers such as ethyl, methyl, and wood, or mixtures thereof. Preferably, the filler comprises from about 5% to about 50% of the gum base. More preferably, the filler comprises from about 25% to about 45% of the gum base.

In addition to the fatty acid glyceride and vegetable oil softeners described above, other types of softeners may also be added to the gum base composition. Such softeners include but are not limited to tallow, hydrogenated tallow, cocoa butter, glycerol monostearate, glycerol triacetate, and lecithin, or mixtures thereof. Though glycerol triacetate may be used concomitantly with the glyceride softeners, it is used in low levels, and preferably the inventive gum base is free of glycerol triacetate. These softeners may constitute from about 0% to about 15% of the gum base, and preferably, constitute from about 1% to about 7%.

Colorants and whiteners may also be added to the gum base and include, but are not limited to, FD&C-type lakes, fruit and vegetable extracts, titanium dioxide or mixtures thereof. Colorants and whiteners may be added to the gum base from about 0% to about 5%, and preferably, from about 0% to 1%.

Further, antioxidants and preservatives may be added from about 0% to about 0.1% of the gum base, depending on the type added. Examples of natural or artificial antioxidants and preservatives that may be added to the gum base include BHA, BHT, beta-carotenes, acidulants (e.g. Vitamin C), propyl gallate and the like.

Examples of gum base compositions within the scope of this invention are provided below in Table 1.

TABLE 1

|  | A | B | C | D | E | F |
|---|---|---|---|---|---|---|
| PVA | — | — | — | — | — | 30.0 |
| GLYCEROL TRIACETATE | — | — | — | — | — | 4.0 |
| B 100/20 VL | 18.0 | 20.00 | 22.00 | 20.6 | 25.6 | — |
| B 500/40 VL | 6.0 | — | — | — | — | — |
| B 500/20 VL | — | 4.00 | — | — | — | — |
| AMG | 1.5 | — | 2.50 | 4.6 | 4.3 | — |
| PALM OIL | — | 4.00 | — | — | — | — |
| COCONUT OIL | 3.0 | — | — | — | — | — |
| PIB | — | 6.00 | 5.40 | 5.4 | 5.0 | 9.0 |
| CaCO$_3$ | — | 35.78 | 40.45 | 46.7 | 38.4 | 24.9 |
| TALC | 36.9 | — | — | — | — | — |
| ROSIN ESTERS | 12.0 | 15.60 | 15.70 | — | 13.6 | 13.0 |
| TERPENE RESINS | 5.6 | — | — | 8.6 | — | — |
| MICROCRYSTALLINE WAX | 3.0 | — | — | — | — | — |
| PARAFFIN WAX | 6.0 | 8.20 | 7.30 | 7.3 | 6.8 | 13.0 |
| GLYCEROL MONOSTEARATE | 5.3 | 4.90 | 6.60 | 6.7 | 6.2 | 6.0 |
| COLOR | 0.8 | — | — | — | — | — |
| ANTIOXIDANT | 0.1 | 0.08 | 0.05 | 0.1 | 0.1 | 0.1 |
|  | 100.0% | 100.0% | 100.0% | 100.0% | 100.0% | 100.0% |

The gum base components are then processed by a single step method, typically adding an amount of elastomer, VL/VA of the present invention, elastomer plasticizer, and filler to a heated sigma blade mixer with a front to rear blade speed ratio of typically 2:1. The initial amounts of ingredients are determined by the working capacity of the mixing kettle, in order to attain the proper consistency. After the initial ingredients have massed homogeneously, the balance of the elastomer solvent, filler, softeners, and other ingredients are added in a sequential manner until a completely homogeneous molten mass is attained. This is usually achieved in one-half to three hours, depending on the formulation. The final mass temperature is between 60° C. and 150° C., and preferably, between 100° C. and 120° C. These temperatures will vary depending on the type of VL/VA added to the base formula. The completed molten mass is then emptied from the mixing kettle into coated or lined pans, extruded or cast into any desirable shape and allowed to cool and solidify.

Alternatively, the VL/VA may be added to the heated sigma blade mixer along with the softener. These ingredients may be allowed to blend independently of other subsequently added ingredients. This pre-blend is completed in about 5 to 30 minutes, and preferably, in about 10 to 20 minutes. The other ingredients may then be added to the pre-blend. The pre-blended VL/VA and softener may also be removed and used either immediately or at a later time in a gum base.

The specific gum base compositions described in Table 1 may be prepared according to the general processes described above.

According to another preferred embodiment of the present invention, the gum base described above is added to a chewing gum formulation, and preferably, to a bubble gum formulation. Preferably, the gum base comprises from about 5% to about 95% of the chewing gum or bubble gum. More preferably, the gum base comprises from about 10% to about 50%, and most preferably, from about 20% to about 35% of the chewing gum or bubble gum.

In general, a chewing gum or bubble gum comprises a water-insoluble gum base portion, a water-soluble bulk portion, and typically, water-insoluble flavor ingredients. The water-soluble bulk portion dissipates with a portion of the flavor over time during chewing. The gum base portion is retained in the mouth throughout the chew.

The water-soluble portion of the gum may comprise softeners, sweeteners, and flavoring agents or combinations thereof. The softeners are added to the chewing gum to optimize the chewing ability and mouth feel of the gum. Softeners, also known in the art as plasticizers, generally constitute about 0.5% to about 15% of the chewing gum. Softeners contemplated by the present invention include glycerin, lecithin, and combinations thereof. Aqueous sweetener solutions such as those containing sorbitol, hydrogenated starch hydrolysates, corn syrup, and combinations thereof, may also be used as softeners and binding agents in gum.

Sweeteners contemplated for use in the present invention include both sugar and sugarless components. Sugar sweeteners include, but are not limited to, dextrose, maltose, dextrin, dried invert sugar, sucrose, fructose, levulose, galactose, and corn syrup solids, alone or in any combination. Sugarless sweeteners generally include, but are not limited to, sorbitol, mannitol, xylitol, hydrogenated starch hydrolysates, and maltitol. Also contemplated for direct addition to the gum are high intensity sweeteners such as aspartame, Sucralose ®, cyclamate, acesulfame-K, dihydrochalones, glycyrrhizin, alitame, and saccharin, and the food-acceptable salts thereof. Those persons skilled in the art will recognize that any combination of sugar/sugarless sweeteners may be employed. Further, a sweetener may be present in a chewing gum in whole or in part as a water-soluble bulking agent, and the softener may be combined with a sweetener such as an aqueous sweetener solution.

A flavoring agent may be present in the chewing gum in an amount from about 0.1% to about 10% and preferably, from about 0.5% to about 5% of the gum. Flavoring agents may comprise essential oils, synthetic flavors, or mixtures thereof, including but not limited to, oils derived from plants and fruits such as citrus oils, fruit essences, peppermint oil, spearmint oil, clove oil, oil of wintergreen, anise and the like. Artificial flavoring components are also contemplated. Those skilled in the art will recognize that natural and artificial flavoring agents may be combined in any sensorially acceptable blend. All such flavors and flavor blends are contemplated by the present invention.

Optional ingredients such as pharmaceutical agents may also be added to the chewing gum.

In general, chewing gum is manufactured by sequentially adding the various chewing gum ingredients to any commercially available mixer known in the art. After the ingredients have been thoroughly mixed, the gum mass is discharged from the mixer and shaped into the desired forms such as by rolling into sheets and cutting into sticks, extruding into chunks, or casting into pellets.

Generally, the ingredients are mixed by first melting the gum base and adding it to the running mixer. The base may also be melted into the mixer itself. Color may be added at this time. A softener may be added next along with the syrup and a portion of the bulking agent. Further portions of the bulking agents may then be added to the mixer. Preferably, the flavor ingredients are added to the gum mixture near the end of the mixing process. The entire mixing process takes from about 5 minutes to about 15 minutes, however, longer mixing times may be required. Those persons skilled in the art will recognize that many variations of the above-described procedure may be followed.

EXAMPLE

Three laboratory-scale batches of chewing gum were prepared according to the following formulation:

| Ingredient | Weight (%) |
|---|---|
| Base | 25.0 |
| Corn Syrup | 17.0 |
| Sugar | 55.8 |
| Glycerine | 1.5 |
| Fruit Flavor | 0.7 |
| | 100% |

The three gum compositions contained gum bases "C", "E" and "F", respectively, as described in Table 1. The chewing gums were then evaluated by sensory testing of expert panelists. Specifically, the chewing gums were evaluated for cohesion, bubble size, bubble film, bubble tack, and stiffness characteristics. The results are shown in Table 2.

TABLE 2

| | C | E | F |
|---|---|---|---|
| INTERMEDIATE COHESION | 11 | 10 | 14 |
| FINAL COHESION | 11 | 11 | 13 |
| BUBBLE SIZE | 10 | 10 | 10 |

TABLE 2-continued

|  | C | E | F |
|---|---|---|---|
| BUBBLE FILM | 10 | 10 | 12 |
| BUBBLE TACK | 10 | 10 | 9 |
| STIFFNESS | 12 | 10 | 14 |

Cohesion: rated 0-20; 0 = none, 10 = optimum, 20 = high
Bubble Size: rated 0-10; 0 = small, 10 = optimum (large)
Bubble Film: rated 0-20; 0 = very thin, 10 = optimum, 20 = very firm
Bubble Tack: rated 0-10; 0 = very tacky; 10 = no tack
Stiffness (final stage): rated 0-20; 0 = very soft; 10 = optimum; 20 = very stiff While several embodimenst have been described, other embodiments will be apparent to those of ordinary skill in the art. All such embodiments are considered to be within the scope of this invention unless the claims that follow expressly state otherwise.

What is claimed is:

1. A gum base composition comprising:
   (a) about 10% to about 45% by weight elastomer consisting essentially of vinyl laurate/vinyl acetate copolymer;
   (b) about 10% to about 45% by weight elastomer plasticizer;
   (c) about 0.5% to about 15% by weight softener selected from the group consisting of glycerol fatty acid esters, acetylated glycerol fatty acid esters, and vegetable oil and comprising at least one fatty acid having carbon chain length greater than 14; and
   (d) about 1% to about 25% by weight low melting point wax; wherein said base is free of polyvinyl acetate and glycerol triacetate.

2. The base of claim 1 wherein said vinyl laurate/vinyl acetate copolymer has an average GPC molecular weight of about 100,000 MWU to about 140,000 MWU and a vinyl laurate content of about 10% to about 45% by weight of the copolymer.

3. The base of claim 2 wherein said vinyl laurate/vinyl acetate copolymer has a lauric acid content of about 20% by weight of the copolymer.

4. The base of claim 1 wherein said base also comprises about 0% to about 20% polyisobutylene elastomer.

5. The base of claim 1 wherein said softener is an acetylated monoglyceride having a lauric acid content greater than 30% by weight of the glyceride.

6. The base of claim 1 wherein the total vinyl laurate/vinyl acetate copolymer to total softener ratio is about 45:1 to about 2:1.

7. The base of claim 1 wherein said low melting point wax is a paraffin wax having a melting point less than 60° C.

8. The base of claim 1 wherein said gum base is a bubble gum base.

9. A chewing gum composition, comprising:
   a water-insoluble base comprising:
   (a) about 10% to about 45% by weight elastomer consisting essentially of vinyl laurate/vinyl acetate copolymer;
   (b) about 10% to about 45% by weight elastomer plasticizer;
   (c) about 0.5% to about 15% by weight softener selected from the group consisting of glycerol fatty acid esters, acetylated glycerol fatty acid esters, and vegetable oil and comprising at least one fatty acid having carbon chain length greater than 14; and
   (d) about 1% to about 25% by weight low melting point wax, wherein said base is free of polyvinyl acetate and glycerol triacetate;
   and a water-soluble bulk portion comprising softener, sweetener, and flavoring.

10. The composition of claim 9 wherein said chewing gum is a bubble gum.

* * * * *

UNITED STATES PATENT AND TRADEMARK OFFICE
CERTIFICATE OF CORRECTION

PATENT NO. : 5,173,317
DATED : December 22, 1992
INVENTOR(S) : Scott E. Hartman et al.

It is certified that error appears in the above-indentified patent and that said Letters Patent is hereby corrected as shown below:

<u>ON THE TITLE PAGE</u>

Under the heading "U.S. PATENT DOCUMENTS", in column 2, after line 16, add --Re. 29,871--.

Under the heading "FOREIGN PATENT DOCUMENTS", in column 2, please add

--2830324    West Germany
  686750     Belgium--.

Column 4, in Table 1, in the twelfth line (across from CaCO₃), the fourth column, please delete "40.45" and substitute --39.50--.

Signed and Sealed this

Twenty-first Day of March, 1995

Attest:

BRUCE LEHMAN

*Attesting Officer*        *Commissioner of Patents and Trademarks*